United States Patent [19]

Mahler et al.

[11] 4,023,912
[45] May 17, 1977

[54] SOLID STICK PAN LUBRICANT

[75] Inventors: Darrell G. Mahler; Charles Doumani, both of Los Angeles, Calif.

[73] Assignee: Blue Cross Laboratories, Inc., North Hollywood, Calif.

[22] Filed: May 11, 1976

[21] Appl. No.: 685,364

Related U.S. Application Data

[63] Continuation-in-part of Ser. No. 537,172, Dec. 30, 1974, abandoned.

[52] U.S. Cl. .................................. 401/82; 106/244; 106/267; 252/12; 426/609; 428/484
[51] Int. Cl.² ...................... C10M 7/44; B05C 1/02
[58] Field of Search ............ 426/609, 604; 401/82; 212/12; 106/244, 267

[56] References Cited

UNITED STATES PATENTS

| | | | |
|---|---|---|---|
| 1,328,556 | 1/1920 | Bloch | 426/609 |
| 2,089,470 | 8/1937 | Epstein | 426/604 |
| 2,626,847 | 1/1953 | Brown | 401/55 |
| 2,796,363 | 6/1957 | Lalone | 428/484 |

Primary Examiner—Theodore Morris
Attorney, Agent, or Firm—Louis J. Bachand

[57] ABSTRACT

Solid stick cookware lubricant consisting essentially of lecithin and an ablative base of normally solid fatty alcohol esters such as hard fats and waxes and normally liquid comestible oils, in proportions to deposit a lubricating effective layer of lecithin onto the surface of cookware with hand pressure.

29 Claims, 5 Drawing Figures

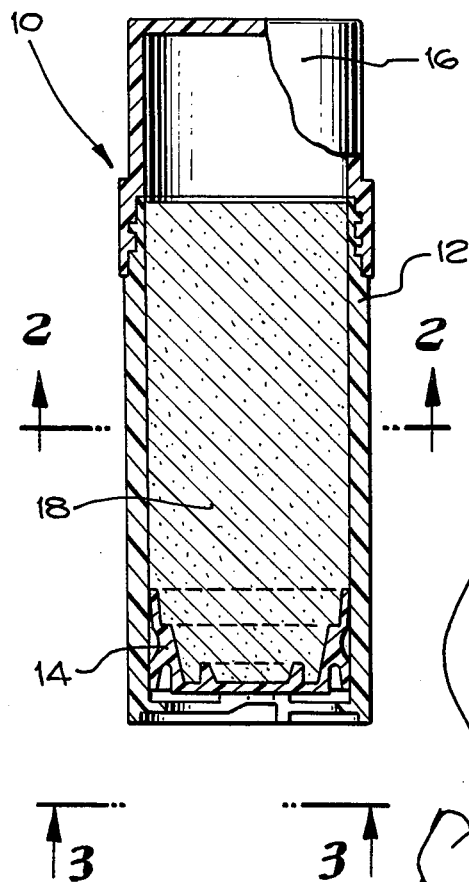
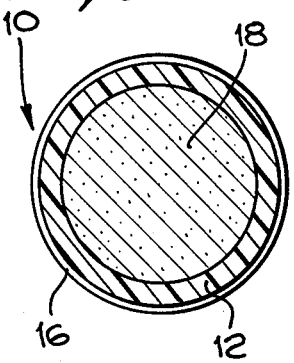
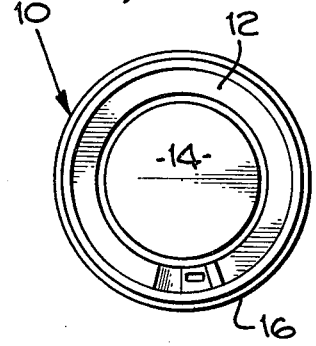
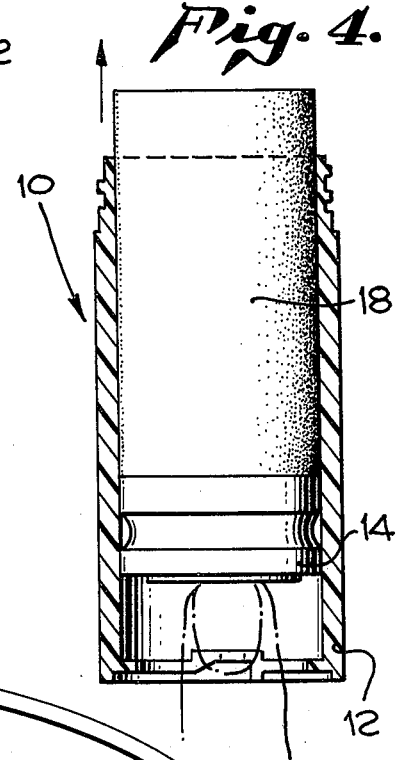
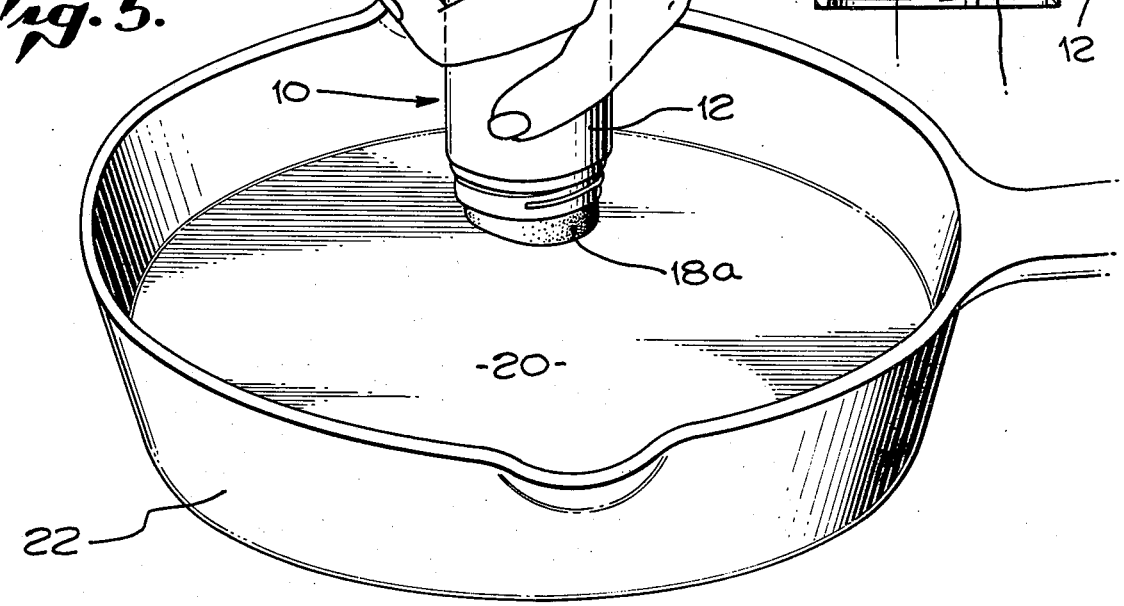

SOLID STICK PAN LUBRICANT

REFERENCE TO RELATED APPLICATION

This application is a continuation in part of and incorporates by reference the disclosure of our copending application Ser. No. 537,172 filed Dec. 30, 1974 now abandoned.

BACKGROUND OF THE INVENTION

This invention has to do with cookware surface lubrication. More particularly, the invention relates to a solid stick form of lecithin which can be applied by hand pressure to deposit a lubricating effective layer of lecithin onto a cookware surface.

The lubrication of cookware ranging from barbeque grills, baking tins, cake pans, frying pans and utensils, to related items such as ice cube trays has found used a variety of greasy and near greasy chemicals including butter, margarine and silicone or polytetrafluoromethane coatings.

PRIOR ART

Recently there has come to national marketing an aerosol applied cookware surface lubricant which comprises lecithin in a propellant solvent. This system is described in U.S. Pat. No. 2,796,363 to Lalone. While the product has opened new markets to lecithin which is physiologically superior as a lubricant to butter for example, the delivery of adequate quantities of lecithin uniformly over the pan surface is not always achieved, and the use of halogenated hydrocarbon propellants is not environmentally or safety favored.

The purpose of using lecithin is to lubricate the cookware surface. It has been found that the presence of a thin covering of lecithin on a frying pan will enable eggs to slide easily therefrom, avoiding yoke-breaking pokes with a spatula, and because foods do not stick clean-up is facilitated.

SUMMARY OF THE INVENTION

It is a major objective of the present invention to make readily achievable the benefits of lecithin usage on cookware without the use of propellants or aerosols. It is a further objective to provide a simple reliable form of lecithin for accurate, controllable and ready application to cookware, at lower cost per use and without the objectionable side effects of aerosol delivered product such as release of halogenated propellant into the atmosphere, exposure of persons to propellant vapors, inadequate surface coverage, misdirection in application, and the presence of toxic chemicals in the home.

These and other objects of the invention to become apparent hereinafter are realized in accordance with the invention by the use of lecithin in an ablative base which is ablated and/or melted away by application of the product to the cookware surface to be heated, with or without preheating.

More particularly the invention provides a solid stick cookware lubricant comprising a minor proportion of lecithin and a major proportion of an ablative base therefor comprising a normally solid material consisting essentially of fatty alcohol ester selected from a hard fat and/or wax, and a normally liquid comestible oil in proportions enabling ablative action upon wiping on a cookware surface with hand pressure alone to deposit the lecithin in an effective amount to lubricate the surface.

Specifically, the invention provides a solid stick cookware lubricant consisting essentially per 100 parts by weight of from 10 to 30 parts of lecithin, and from 70 to 90 parts correspondingly of an ablative base, the base comprising a room temperature normally solid hard fat or wax and a room temperature liquid comestible oil in proportion to deposit a lubricating effective layer of lecithin onto the cookware surface with hand pressure wiping. The hard fat and/or wax may be present in the ablative base in an amount between 40 and 60 parts, and the oil in an amount between 30 and 40 parts, by weight. The fat comprises generally an ester of a trihydric fatty alcohol and may particularly comprise hydrogenated fatty acid glycerides e.g. glyceride hydrogenated tallow, and hydrogenated vegetable oil glycerides e.g. of soy, corn, safflower, sesame, cottonseed and/or olive oils, and the liquid comestible oil a vegetable oil e.g. nonhydrogenated counterparts of the just mentioned oils, or a white mineral oil. The wax comprises any of the various esters of monohydric fatty alcohols and specifically beeswax, Ozerkerite, Carnauba, mineral wax, palm wax, parafin wax and the like, and mixtures thereof.

In preferred vegetable oil systems particularly adapted to be dispensed from a container from which the stick is controllably extended in the manner of a stick deodorant, the composition will consist essentially per 100 parts by weight of from 15 to 20 parts of lecithin, and from 80 to 85 parts of an ablative base comprising from 40 to 60 parts of a room temperature solid hard fat and from 30 to 40 parts of a room temperature liquid vegetable oil. In the white mineral oil systems it is preferred to employ from 5 to 20 parts of the lecithin, and from 80 to 95 parts of the ablative base, which base may comprise correspondingly from 50 to 60 parts of the room temperature solid hard fat and from 30 to 45 parts of the white mineral oil typically having a specific gravity above 0.80.

There may further be added to the composition to assist compatibility of the mentioned ingredients and ease manufacture while facilitating obtention of a suitably firm yet ablative stick, a minor amount e.g. 0.1 to 10 parts of an ethoxylated glycerol or sorbitol glyceryl or fatty acid ester food grade emulsifier.

The physical characteristics of the stick as to spreadability and rigidity are important and may be gaged to be present in a stick form of the composition having a penetration value at 77° F of between about 30 to 35 and 60 to 65 (ATSM D-1321, 1322) and a congealing temperature in the range of 120° to 145° F depending on properties desired. (ASTM D-87-66)

BRIEF DESCRIPTION OF THE DRAWINGS

The invention will be further described as to an illustrative embodiment in conjunction with the attached drawing wherein FIG. 1 is a view in vertical section of the pan lubricant stick composition in a container according to the invention;

FIG. 2 is a view taken on line 2—2 thereof;

FIG. 3 is a bottom plan view on line 3—3 in FIG. 1;

FIG. 4 is a view like FIG. 1 showing the stick uncovered and partly extended as for use; and FIG. 5 is a pictorial view of application of the extended stick to a cookware surface.

DESCRIPTION OF THE PREFERRED EMBODIMENTS

The problems with erratic delivery and spotty coverage of lecithin by aerosol techniques can be solved with the stick form of lecithin delivery system disclosed herein by combining the lecithin, in relatively great amounts, with an ablative base having the proper characteristics of wear (hot or cold) and rigidity to be operable like a brush to place the lecithin everywhere desired, and nowhere else. Thus the key to satisfying the need for a more ready form of lecithin cookware lubricant is in the development of a delivery system having, in combination with lecithin, the proper degree of stiffness and the proper amount of abrasion or heat erosion to deposit the desired quantity of lecithin.

We have found that certain blends of hard fats or waxes and liquid comestible oils can be mixed with lecithin and provide the benefits of lecithin as a cookware surface lubricant while metering the amount of deposit and ensuring accuracy of placement, all conveniently by hand pressure and without the use of noxious chemicals. "Liquid comestible oil" herein refers to vegetable oils liquid at room temperature (defined below) and white mineral liquid at room temperature (sometimes referred to as liquid petrolatum) and which are suitable for human ingestion as manifested by acceptance by the Food and Drug Administration, or listing in the United States Pharmacopea or National Formulary as suited for such purpose.

A typical composition range for use in stick form is as follows: (per 100 parts by weight)

| | |
|---|---|
| Comestible Oil | 30–40 or 45 parts |
| Lecithin | 5 or 15–20 parts |
| Hydrogenated Fatty Acid Glyceride or Wax | 40–50 or 60 parts |

In preparing the present cookware lubricant sticks the following desiderate obtain: Commercial lecithin is a viscous semi-fluid and stick mass unsuited to wiping application. While lecithin can be successfully dissolved in propellant and sprayed in aerosol form, that mode of application is subject to the practical and healthful limitation discussed above. It is our purpose to so compound lecithin as to obtain the benefits of this natural food fat including its inherent surface active properties, in a novel and convenient-to-apply form, i.e. as a readily spreadable composition for cooking and frying surfaces.

Accordingly we provide a solid, formable material comprising lecithin and an ablative base. "Lecithin" herein refers to the material normally derived from soy beans and egg yolks but obtainable from like natural products, which typically comprises a viscous liquid or semi-solid, mixture of various diglycerides of stearic, palmitic, and oleic acids, linked to the choline ester of phosphoric acid. Typically lecithin is "commercial lecithin" and contains about 4% phosphorous by weight. Lecithin of varying grades of purity can be used and typically is present in an amount between 5 and 30 parts by weight in the stick composition, preferably from 5 to 15 up to 20 parts, and in most preferred stick systems about 10 to 15 parts, by weight. An excessive amount of lecithin is reflected in a too soft composition and one which may have an unduly detectable level of lecithin odor. On the other hand too little lecithin is counterproductive since the purpose of the stick is to deliver lecithin onto a cookware surface in a new and convenient way. In general it may be observed that a higher level of lecithin is obtained by stick application than by aerosol spray application and with improved placement accuracy.

Because the lecithin is inherently too soft for stick configuration, we combine the lecithin into an ablative configuration. The composition of the ablative base is significant in the success of the stick applicator. The ablative base must be characterized by controlled erosion under heat and/or hand pressure to meter the proper proportion of lecithin onto the cookware surface. Too soft an ablative base will give unduly high levels of lecithin coverage and be too quickly consumed for user satisfaction. Too hard an ablative base will not only give poor surface coverage but will require undue hand pressure and be objectionable from a consumer standpoint.

In general it is desirable that the stick have a penetration value per ASTM D-1321-70 of about 60 to 65 at about 77° F and between about 30 and 70 over the range of room temperatures encountered in use e.g. 50° F to 90° F. The stick may be applied to a hot surface and for this purpose desirable has a congealing temperature of about 120–124 to about 140 to 145° F per ASTM 87–66.

The composition of the ablative base is a mixture of a normally solid i.e. at room temperature, hard fatty acid glyceride and a normally liquid, i.e. at room temperature or slightly above, comestible oil. These components should be food grade materials. Room temperature herein refers to a temperature between about 50° F and 90° F.

For purposes of stick formulation there may be employed as the hard fat, fatty acid glycerides, particularly hydrogenated tallow and hydrogenated vegetable oil glycerides e.g. of the vegetable oil materials listed hereinafter with reference to the liquid vegetable oil component of the ablative base. Thus there may be included monoglycerides, and diglycerides, and mixtures thereof generally obtained from the glycerolysis of edible hard fats or vegetable oils, as well as fatty acid esters such as the sorbitan esters of palmitic and stearic acid. Thus, for example, there may be mentioned as suitable hard fat materials glyceryl monostearate, propylene glycol stearate, sorbitan monostearate, sorbitan tristearate and the like each in molecular weights and grades affording the desired hardness in the stick formulation. In addition to imparting the requisite hardness to the stick, many of the aforementioned hard fats will contribute to the overall lubricity obtained.

It has been found that hard fats are too hard or insufficiently lubricous to lay down an adequate coating of lecithin with a comfortable wiping action. Accordingly, there is provided in accordance with the invention, a modification of the hard fat by the incorporation of the normally liquid comestible oil. Among suitable comestible oils are these vegetable oils: corn oil, soy oil, safflower oil, sesame oil, cottonseed oil and olive oil, peanut oil, cocoa butter, coconut oil, palm nut and other fruit pit oils, and others of materials described as glyceryl esters of lauric, linoleic, oleic and linolenic acid type materials.

White mineral oils liquid at room temperature are also useful including those having a specific gravity of 0.80 and above and more particularly, 0.85 to 0.90 (per ASTM D 1298 at 77° F/77° F) and a viscosity of 350–450 Saybolt Universal Seconds (per ASTM D 2161 at 100° F). Typical materials are Chevron White Oils e.g. No. 15, USP. Excessive amounts of vegetable or mineral oil will cause unduly rapid ablative action in use and thus oil and hard fat proportions need to be controlled. As noted above the "hard fat" component can be a suitable hydrogenated version of the mentioned vegetable oils and the terms "hard fat" and "fatty acid glyceride" herein are intended to embrace both the hydrogenated tallow and hydrogenated vegetable oil type material.

In general, and particularly with reference to the vegetable oil embodiments hereof, the ablative base comprises 70 to 90 parts of the stick and that quantity is apportioned between the hard fat and vegetable oil as follows: The hard fat comprises from 40 to 60 parts and the vegetable oil from 30 to 40 parts, by weight, but together not more than 70 to 90 parts by weight of the lubricating composition. In higher lecithin systems, i.e. those containing 15 to 20 parts by weight of lecithin per 100 parts, it is preferred to use from 30 to 40 parts of the vegetable oil and from 40 to 50 parts of the hard fat. In lower lecithin content and mineral oil containing systems, and those containing both mineral oil and liquid vegetable oils, i.e. containing from 5 to 30 and preferably about 10 to 15 and most particularly 10 parts of lecithin, the ablative base may be present in an amount of 70 to 95 parts by weight, and may comprise 40 to 60, preferably 50 to 60 parts of the room temperature solid material, and correspondingly 30 to 45 preferably 30 to 40 parts of the oil.

A highly desirable stick, free of unsightly oozing of liquid from the stick and offering a desirable spreadability is one containing per 100 parts by weight 10 to 15 parts of lecithin, 50 to 55 parts of hydrogenated fatty acid glyceride and about 35 parts of vegetable oil such as soybean oil.

In certain embodiments, and to facilitate cookware cleaning a surface active adjuvant or organic emulsifier may be employed generally in small amounts, by weight of from 0.1 to 10 parts per 100 and preferably from 0.5 to 2 parts per 100 parts of the stick composition. Among suitable surface active adjuvant or emulsifiers are those known as edible detergents of which there may be mentioned ethoxylated mono and diglycerides of fatty acids, ethoxylated glyceryl and sorbitan esters, and the like including particularly the mentioned monoglycerides and diglycerides, glyceryl lactyl fatty acid esters, sorbitan monostearate, stearyl —2— lactylic acid, ethoxylated propylene glycol, monoglyceridyl citrate and polyglycerol fatty acid esters, and the like including suitable ones of the hard fat materials listed hereinabove.

The compositions are prepared by adding together and mixing, preferably the flaked hard fat into the liquid oil and lecithin mixture, preheated or with heating to between 150° – 160° F, and mild agitation, the several ingredients and cooling rapidly in the desired form.

With reference now to the drawings, in FIGS. 1 – 3 a solid stick cookware lubricant container is depicted at 10 comprising a generally cylindrical base 12 having a close fitting piston 14 forming the bottom closure thereof and a screw cap closure 16. The stick 18 of lubricant is formed in the base 12 by filling thereinto against the piston 14 which slides vertically in the base to project more or less of the lubricant stick 18 from the base. In use and with reference to FIGS. 4 and 5, a portion 18a of the stick is projected outwardly by finger pressure and the container held by hand at an angle against the surface 20 of cookware 22 as shown. A wiping action deposits the lecithin ablative base mixture onto the surface, at a rate determined by the surface temperature, the hand pressure and the ablation erosion characteristic of the ablative base relative to heat and abrasion. In certain embodiments the lecithin may be nonuniformly distributed within the base material e.g. as pockets or a central core which is arranged to reliably deposit the lecithin upon wiping on the cookware surface.

EXAMPLES

1. A solid stick cookware surface lubricant was prepared by mixing together heated the following, (All parts by weight):

| | |
|---|---|
| Tallow, glyceride hydrogenated | 50 |
| Lecithin, double bleached | 15 |
| Soybean Oil | 35 |
| | 100 |

The mixture was thoroughly stirred together and poured into a mold defined by a cylindrical base having a piston therein. The mixture quickly solidified into a hard, crayon-like rod or stick which was self-supporting and fluid-free on the surface when projected from the container by pushing on the piston.

Penetration value (ASTM D-1321-70 was between 60 and 65. Congealing temperature was 140-145 F per ASTM 87-66.

The foregoing stick was applied to heated or cold frying pan surfaces. In each instance coverage was rapid and complete. The process was extensively repeated to determine product life and hundreds of fry pans could be coated with a single stick.

The coated pan surface was tested by frying an egg sunny side up thereon. The pan surface lubricity was outstanding with simple spatula egg removal without breaking being easily realized.

2. Example 1 is duplicated employing 60 parts of the hydrogenated soybean oil glyceride as typical of hydrogenated vegetable oils e.g. hydrogenated cottonseed oil may be used, 10 parts of lecithin and 30 parts of soybean oil. An effective pan lubricant is realized.

3. Example 1 is duplicated employing 40 parts of the hydrogenated tallow, 20 parts of lecithin and 40 parts of soybean oil. An effective pan lubricant is realized.

4. Example 1 is duplicated employing 2 parts of ethoxylated (20 moles) sorbitan monostearate in lieu of a like amount of hard fat. An effective pan lubricant is realized Pan clean-up is easier.

5. Example 1 is duplicated using safflower oil in place of soybean oil. An effective pan lubricant is realized.

6. Example 1 is duplicated using hydrogenated cottonseed oil glyceride in lieu of a like amount of hydrogenated tallow glyceride. An effective lubricant is realized.

7. Example 4 is duplicated using 0.5 part of exthoxylated (20 moles) sorbitan monolaurate in lieu of a like amount of hard fat. An effective pan lubricant is realized. Pan clean-up is easier than with the Example 1 formulation.

8. Example 1 was duplicated using the following formulation, illustrative of the use of wax in lieu of hard fat: (All parts by weight)

| | |
|---|---|
| USP White Beeswax | 50 |
| Lecithin | 15 |
| Soy Oil | 35 |
| Penetration value was 60-65 | 100 |

9. Example 8 was duplicated but with the addition of 0.5 part of ethoxylated sorbitan monolaurate.

10. Example 8 was duplicated using Ozerkerite wax. Penetration value was 30 – 35.

A satisfactory lubricant stick was obtained in each of Examples 8, 9, 10.

11. Example 1 was duplicated employing 10 parts of lecithin in soy oil, 54 parts hydrogenated cottonseed oil flakes (Titer 58 – 60 C) and 36 parts white mineral oil (Chevron No. 15 USP). A superior performing stick was obtained in terms of lubricating effectiveness, and advantageously smoking on the heated pan was reduced over that encountered with a vegetable oil and the characteristic lecithin odor was less evident than in the Example 1 product.

In addition to the foregoing, the present product can contain various special purpose additives for particular effects including perfumes, colorants, vitamin supplements, flavor enhancers and the like in effective amounts e.g. ranging from 0.05 to 1% by weight based on the total weight of the composition. Among such additives there may be especially mentioned carotene, vanillin and synthetic butter flavor which may serve to mask the odor of lecithin as well as contribute its own distinctive flavor attribute.

We claim:

1. Solid stick cookware lubricant consisting essentially per 100 parts by weight of from 10 to 30 parts of lecithin, and from 70 to 90 parts of an ablative base, said base comprising room temperature solid material consisting essentially of fatty alcohol esters selected from hard fats and waxes and a room temperature liquid vegetable oil in proportions of between 40 and 60 parts of said normally solid material and between 30 and 40 parts of said oil, to deposit a lubricating effective layer of lecithin onto the cookware surface with hand pressure wiping.

2. Solid stick cookware lubricant according to claim 1 in which said normally solid material comprises hydrogenated fatty acid glyceride.

3. Solid stick cookware lubricant according to claim 1 in which said normally solid material comprises wax.

4. Solid stick cookware lubricant according to claim 1 in which said liquid vegetable oil comprises at least one of soy, corn, safflower, sesame, cottonseed and olive oil.

5. Solid stick cookware lubricant according to claim 1 in which said oil comprises at least one of soy, corn, safflower, sesame, cottonseed, and olive oil and said normally solid material is a fat comprising at least one of hydrogenated vegetable oil glycerides and tallow glyceride.

6. Solid stick cookware lubricant consisting essentially per 100 parts by weight of from 15 to 20 parts of lecithin, and from 80 to 85 parts of an ablative base, said base comprising from 40 to 60 parts of a room temperature solid hard fat and from 30 to 40 parts of a room temperature liquid vegetable oil.

7. Solid stick cookware lubricant according to claim 6 including also from 0.1 to 10 parts of a glyceryl or fatty acid ester emulsifier.

8. Solid stick cookware lubricant according to claim 6 in which said stick has a penetration value between about 30 to 35 and 60 to 65 at 77° F and a congealing temperature of about 140° – 145° F.

9. Solid stick cookware lubricant according to claim 6 in which said fat comprises hydrogenated vegetable oil glyceride, hydrogenated tallow glyceride, or mixtures thereof.

10. Solid stick cookware lubricant according to claim 6 in which said oil comprises at least one of soy, corn, safflower, sesame, cottonseed, and olive oil.

11. Solid stick cookware lubricant according to claim 6 in which said fat comprises hydrogenated tallow glycerides and said oil comprises at least one of soy, corn, safflower, sesame, cottonseed, and olive oil.

12. Solid stick cookware lubricant according to claim 6 in which said fat comprises hydrogenated vegetable oil glycerides and said oil comprises at least one of soy, corn, safflower, sesame, cottonseed, and olive oil.

13. The solid stick cookware lubricant according to claim 1 in combination with a container therefor from which the stick is controllably extendable for use.

14. The combination according to claim 13 in which said container comprises a generally cylindrical body, a cover therefor and a piston therewithin manually slidable within the cylinder to controllably extend the stick for use.

15. Solid stick cookware lubricant consisting essentially per 100 parts by weight of from 5 to 30 parts of lecithin, and from 70 to 95 parts of an ablative base, said base comprising room temperature solid material consisting essentially of fatty alcohol esters selected from hard fats and waxes and a room temperature liquid comestible oil in proportions of between 40 and 60 parts of said normally solid material and between 30 and 40 parts of said oil, to deposit a lubricating effective layer of lecithin onto the cookware surface with hand pressure wiping.

16. Solid stick cookware lubricant according to claim 15 in which said normally solid material comprises hydrogenated fatty acid glyceride.

17. Solid stick cookware lubricant according to claim 15 in which said normally solid material comprises wax.

18. Solid stick cookware lubricant according to claim 15 in which said liquid comestible oil is a liquid vegetable oil.

19. Solid stick cookware lubricant according to claim 18 in which said liquid vegetable oil comprises at least one of soy, corn, safflower, sesame, cottonseed and olive oil.

20. Solid stick cookware lubricant according to claim 15 in which said liquid comestible oil is a liquid white mineral oil having a specific gravity above about 0.80.

21. Solid stick cookware lubricant according to claim 20 in which said liquid white mineral has a specific gravity between about 0.85 and 0.90.

22. Solid stick cookware lubricant according to claim 21 in which said normally solid material is a fat comprising at least one of hydrogenated vegetable oil glycerides and tallow glycerides.

23. Solid stick cookware lubricant consisting essentially per 100 parts by weight of from 5 to 20 parts of lecithin, and from 80 to 95 parts of an ablative base, said base comprising from 50 to 60 parts of a room temperature solid hard fat and from 30 to 45 parts of a room temperature liquid comestible oil selected from the group consisting of vegetable oils and white mineral oils having a specific gravity above 0.80.

24. Solid stick cookware lubricant according to claim 23 in which said liquid comestible oil is white mineral oil.

25. Solid stick cookware lubricant according to claim 24 including also from 0.1 to 10 parts of a glyceryl or fatty acid ester emulsifier.

26. Solid stick cookware lubricant according to claim 24 in which said stick has a penetration value between about 30° to 35° and 60° to 65° at 77° F and a congealing temperature of about 120° – 125° F.

27. Solid stick cookware lubricant according to claim 24 in which said fat comprises hydrogenated vegetable oil glyceride, hydrogenated tallow glyceride, or mixtures thereof.

28. The solid stick cookware lubricant according to claim 24 in combination with a container therefor from which the stick is controllably extendable for use.

29. The combination according to claim 28 in which said container comprises a generally cylindrical body, a cover therefor and a piston therewithin manually slidable within the cylinder to controllably extend the stick for use.

* * * * *

UNITED STATES PATENT OFFICE
CERTIFICATE OF CORRECTION

PATENT NO. : 4,023,912
DATED : May 17, 1977
INVENTOR(S) : Darrell G. Mahler, Charles Doumani It is certified that error appears in the above-identified patent and that said Letters Patent are hereby corrected as shown below:

In column 8, line 55, after the word "mineral", insert --oil--.

In column 9, line 9, for 30°, 35°, 60°, 65°, read -- 30 to 35 and 60 to 65 --.

Signed and Sealed this twenty-third Day of August 1977

[SEAL]

Attest:

RUTH C. MASON
Attesting Officer

C. MARSHALL DANN
Commissioner of Patents and Trademarks